United States Patent [19]

Nakamura

[11] Patent Number: 5,030,683

[45] Date of Patent: Jul. 9, 1991

[54] AQUEOUS COATING COMPOSITION FOR CANS

[75] Inventor: Tetuhisa Nakamura, Tokyo, Japan

[73] Assignee: Toyo Ink Manufacturing Co., Ltd., Tokyo, Japan

[21] Appl. No.: 432,878

[22] Filed: Nov. 7, 1989

[30] Foreign Application Priority Data

Apr. 25, 1989 [JP] Japan .................................. 1-103379
Apr. 25, 1989 [JP] Japan .................................. 1-103380

[51] Int. Cl.$^5$ ............................................. C08L 61/00
[52] U.S. Cl. ..................................... 524/512; 524/555
[58] Field of Search ................................ 524/512, 555

[56] References Cited

U.S. PATENT DOCUMENTS 4,221,683 9/1980 Nakate et al. ........................... 524/32
4,530,958 7/1985 Kasari et al. .......................... 524/441

Primary Examiner—Joseph L. Schofer
Assistant Examiner—Jeffrey T. Smith
Attorney, Agent, or Firm—Wenderoth, Lind & Ponack

[57] ABSTRACT

An aqueous coating composition for cans which forms a coating having high hardness and a smaller organic solvent content and generates a smaller amount of fumes when baked at a high temperature, and which comprises, as a resin component, (A) an alkyl-etherified amino resin formed by attaching, on average, not less than three, per molecule of spiroguanamine or melamine, formaldehydes to spiroguanamine or a mixture of spiroguanamine with melamine under an addition or condensation reaction, and then alkyl-etherifying the resultant addition or condensation reaction product with methanol, ethanol or a mixture of these, and (B) an aqueous polyester or acrylic resin having a specific acid value and hydroxyl value and being soluble or dispersible in an aqueous medium in the presence of a volatile base.

7 Claims, No Drawings

AQUEOUS COATING COMPOSITION FOR CANS

FIELD OF THE INVENTION

The present invention relates to an aqueous coating composition for use on cans which comprises an alkyl-etherified amino resin derived from spiroguanamine alone or an amino compound composed of melamine and spiroguanamine and an aqueous polyester resin or an aqueous acrylic resin, and in particular, it relates to an aqueous coating composition for use on cans which can form a coating having excellent water resistance, hardness and flexibility.

DESCRIPTION OF THE RELATED ART

The outer surface of a beverage can containing a soft drink and a food can containing food are coated with a coating which prevents corrosion of the can material, enhances aesthetic commercial value and withstands a heat treatment step for sterilizing food. Such a coating has been conventionally formed by applying a solution of an epoxy/amino-based resin, acryl/amino-based resin, polyester/amino-based resin, or the like in an organic solvent with a roll coater, and baking the resultant coated can in a gas oven to harden its coating. However, these coating compositions cause volatilization of a large amount of the solvent at the baking time, and hence cause air pollution. Further, these coating compositions are undesirable in view of saving of resources. Therefore, it has been desired to develop an aqueous coating composition which can solve these problems.

Known aqueous coating compositions are classified into two types such as water-dispersible and water-soluble coating compositions. In general, most of water-dispersible resins are synthesized by emulsion polymerization using a surface active agent, and hence there is a defect that the surface active agent used in a coating composition remains in a formed coating and degrades water resistance. On the other hand, resins containing an acid content (carboxyl group) are also synthesized in an organic solvent system using no surface active agent and neutralized with a volatile base to produce dispersible or water-soluble coating compositions. These aqueous coating compositions are required to have an acid content, as an acid number, of not less than 20 in their fundamental resin structure. Thus, these coating compositions have a defect that they are inferior in water resistance and alkali resistance. In order to correct these defects, there has been employed a method of using a large amount of an aqueous amino resin such as hexamethoxymethylmelamine, methoxymethylated benzoguanamine, or the like. However, the flexibility of resultant coatings is degraded greatly, and when the amount of the aqueous amino resin is decreased to improve the flexibility, the hardness of resultant coatings tends to be degraded. Thus, it has been difficult to achieve a good balance among water resistance, hardness and flexibility of coatings.

Further, conventional aqueous coating compositions contain not less than 10% by weight of an organic solvent in order to improve storage stability and leveling at a coating formation time, and they have not yet been sufficient in view of air pollution caused by solvent volatilization at a baking time and saving of resources.

SUMMARY OF THE INVENTION

It is an object of the present invention to provide an aqueous coating composition for cans which can form a coating having water resistance and which can withstand a step of sterilization of beverage cans and food cans under heat.

It is another object of the present invention to provide an aqueous coating composition which can form a coating having high hardness to reduce occurrence of damages to cans during transportation and flexibility to permit formation of cans in various forms.

It is further another object of the present invention to provide an aqueous coating composition for cans in which the organic solvent content is small.

It is yet another object of the present invention to provide an aqueous coating composition for cans which generates a smaller amount of fumes at a baking time at high temperature.

That is, according to the present invention, there is provided an aqueous coating composition for cans which comprises, as a resin component, (A) 5 to 60% by weight of an alkyl-etherified amino resin formed by attaching, on average, not less than three, per molecule of spiroguanamine or melamine, formaldehydes to spiroguanamine or a mixture of spiroguanamine with melamine under an addition or condensation reaction, and then alkyl-etherifying the resultant addition or condensation reaction product with methanol, ethanol or a mixture of these, and (B) 40 to 95% by weight of an aqueous polyester or acrylic resin having an acid value of 10 to 100 and a hydroxyl value of 10 to 300 and being soluble or dispersible in an aqueous medium in the presence of a volatile base.

DETAILED DESCRIPTION OF THE INVENTION

The component (A) of the present invention, alkyl-etherified amino resin, can be easily synthesized by suitably selecting reaction conditions in the same way as in the synthesis of known melamine resins. For example, spiroguanamine or a mixture of spiroguanamine with melamine and formaldehyde are subjected to an addition reaction at a temperature between 50° C. and 80° C. for 2 to 10 hours, and further the resultant addition reaction product is alkyl-etherified by heating it in the presence of methanol, ethanol or a mixture of these under acid conditions (pH is preferably 2 to 5). In the alkyl-etherification reaction under acid conditions, in particular, condensation degree can be controlled by controlling the reaction time, and hence an alkyl-etherified amino resin having a desirable molecular weight is obtained. The number of formaldehydes attached to spiroguanamine or melamine per molecule thereof is preferably not less than 3, and when this number is less than 3, an alkyl-etherified amino resin tends to be cloudy, and when used as a coating composition, it has inferior compatibility with other aqueous resin and causes layer separation and precipitation. Thus, its stability as a coating composition is inferior. When a mixture system of spiroguanamine and melamine is used, it is preferable to use not less than 20% by weight of spiroguanamine based on the mixture.

In the present invention, the alkyl-etherified amino resin obtained by alkyl-etherification with methanol has excellent ability to be diluted with water and improved stability as a coating composition, and it is hence possible to increase a solid content thereof. And when an alcohol having 3 carbon atoms or more is used, the ability to be diluted with water is poor, and the stability as a coating composition is degraded. In the alkyl-etherification, the number of ether linkages per molecule of spiroguanamine or melamine is preferably not less than 2 on the average, and when the number of ether linkages is less than 2, the stability as a coating is inferior and the water resistance is degraded.

In addition, the spiroguanamine referred to hereinabove stands for 2,4,8,10-tetraoxaspiro[5,5]undecane-3,9-bis(2-ethylguanamine), and the structure thereof is represented by the following formula. This guanamine is available, for example, as CTU guanamine (trade name, manufactured by Ajinomoto Co., Inc.).

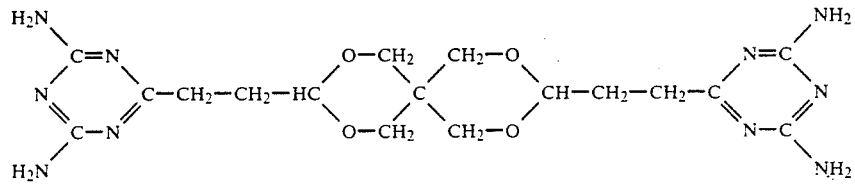

The component (B) of the present invention, aqueous polyester resin, is obtained by polycondensation of a polyhydric alcohol component and a polyvalent carboxylic acid component, and preferably usable are those resins which contain 5 to 45% by weight of phenyl rings introduced by the use of an alcohol or carboxylic acid component having a phenyl ring. Examples of the alcohol component having a phenyl ring include bisphenol A, bisphenoldihydroxypropyl ether, ethyleneoxide-added bisphenol A, etc. Examples of the polyhydric alcohol other than the above include dihydric alcohols such as hydrogenated bisphenol A, ethylene glycol, 1,3-butylene glycol, 1,6-hexanediol, diethylene glycol, dipropylene glycol, neopentyl glycol, triethylene glycol, etc., and trihydric or higher-valence alcohols such as trimethylol ethane, trimethylol propane, trishydroxymethylaminomethane, pentaerythritol, dipentaerythritol, glycerin etc. Examples of the carboxylic acid component having a phenyl ring include (anhydrous) phthalic acid, isophthalic acid, terephthalic acid, hexahydro (anhydrous) phthalic acid, (anhydrous) trimelitic acid, (anhydrous) pyromellitic acid, etc. The other examples of the carboxylic acid component include polyvalent carboxylic acids or anhydrides thereof such as tetrahydro (anhydrous) phthalic acid, methylenecyclohexenetricarboxylic acid (anhydride), adipic acid, azelaic acid, (anhydrous) succinic acid, (anhydrous) maleic acid, fumalic acid, sebacic acid, itaconic acid, etc. Further, monohydric acids such as benzoic acid, t-butyl benzoic acid, etc., may be used as required. And the above polyester resin may be an alkyd resin obtained by reacting three components consisting of the above alcohol component, the above carboxylic acid component and an oil component such as caster oil, dehydrated caster oil, tung oil, safflower oil, soybean oil, linseed oil, tall oil, coconut oil, or the like. Also usable is a graft-modified polyester resin obtained by grafting an acrylic resin on the above polyester resin. When the amount of the phenyl rings in the aqueous polyester resin is less than 5% by weight, the hardness of the resultant coating is inferior, and on the other hand, when said amount is more than 45% by weight, the flexibility of the coating is inferior.

The aqueous acrylic resin, which is also the component (B) of the present invention, is obtained by copolymerization of $\alpha,\beta$-monoethylenically unsaturated carboxylic acid, a hydroxyl group-containing vinyl monomer and other vinyl monomer. Examples of the $\alpha,\beta$-monoethylenically unsaturated carboxylic acid include acrylic acid, methacrylic acid, crotonic acid, maleic acid, fumaric acid, itaconic acid, etc., and in particular, acrylic acid and methacrylic acid are preferred. Examples of the hydroxyl group-containing vinyl monomer include hydroxymethyl acrylate, hydroxyethyl acrylate, hydroxypropyl acrylate, hydroxyamyl acrylate, hydroxyhexyl acrylate, and methacrylates corresponding these. The other vinyl monomer stands for a vinyl monomer which gives a homopolymer having a theoretical glass transition point of not less than 90° C., and preferably usable are methyl methacrylate (giving a homopolymer having a theoretical glass transition point of 105° C.), styrene (ditto 100° C.), acrylamide (ditto 153° C.), acrylonitrile (100° C.), etc. Further usable are acrylic acid alkyl ester or methacrylic acid alkyl ester such as ethyl acrylate, butyl acrylate, 2-ethylhexyl acrylate, cyclohexyl acrylate, ethyl methacrylate, butyl methacrylate, stearyl methacrylate, dicyclohexyl methacrylate, or the like, an N-alkoxyalkyl-substituted amide-containing vinyl monomer such as N-(methoxymethyl)acrylamide, N-(isobuthoxymethyl)acrylamide, N-(buthoxymethyl)acrylamide, or the like, vinyl acetate, vinyl ether, or the like.

The aqueous polyester resin or the aqueous acrylic resin is required to have an acid value in the range of from 10 to 100 and a hydroxyl value in the range of from 10 to 300. When the acid value is less than 10, it is difficult to make a coating composition aqueous, and when the acid value exceeds 100, the resultant coating composition has inferior water resistance. Further, when the hydroxyl value is less than 10, the crosslink density is low and the water resistance is hence poor, and when the hydroxyl value exceeds 300, the flexibility of the coating composition is degraded. The aqueous polyester resin preferably has a weight average molecular weight of 1,000 to 20,000, and the aqueous acrylic resin preferably has a weight average molecular weight of 4,000 to 30,000.

Concerning amounts of the alkyl-etherified amino resin (component A) and the aqueous polyester resin or aqueous acrylic resin (component B) in the coating composition of the present invention, the amount of the alkyl-etherified amino resin is 5 to 60% by weight, preferably 10 to 40% by weight. When the amount of the alkyl-etherified amino resin is less than 5% by weight, the crosslink density of the coating is low and the water resistance is hence inferior, and when this amount is over 60% by weight, the flexibility of the coating is degraded.

As a volatile base thereby to dissolve or disperse the aqueous polyester resin or aqueous acrylic resin in an aqueous medium, there are organic amines such as monoethanolamine, dimethylamine, diethylamine, triethylamine, triethanolamine, diethylethanolamine, morpholine, etc. The amount of the volatile base may be that which can neutralize the carboxylic acid of the aqueous resin at least partially.

The aqueous medium is water or a solvent mixture of water as a main component with a hydrophilic organic solvent, and examples of the hydrophilic organic solvent include alcohol solvents such as isopropyl alcohol, n-butyl alcohol, isobutyl alcohol, n-amyl alcohol, etc., ether solvents such as ethylene glycol monomethyl ether, ethylene glycol monoethyl ether, ethylene glycol monoisopropyl ether, ethylene glycol monobutyl ether, diethylene glycol monobutyl ether, etc., and others.

The coating composition of the present invention is formed into a coating by incorporating, as required, 0.1 to 1 part, based on a resin solid content, of an acid catalyst blocked with amine as a hardening auxiliary, e.g. p-toluene benzene sulfonate, dodecylbenzene sulfonate, dinonylnaphthalene sulfonate, etc. It is also possible to incorporate an aqueous resin or water-dispersible resin generally used as a resin for aqueous coating compositions, e.g. alkoxymethylated melamine, alkoxymethylated benzoguanamine, a water-soluble or water-dispersible acrylic resin, maleic acid-attached fatty acid, a water-soluble polyether polyol resin, a water-soluble polyester polyol resin, a water-soluble or water-dispersible epoxy resin, etc. Similarly, it is also possible to add a leveling agent, an antifoaming agent and a lubricant.

The component (B) of the present invention may also be a pigment paste obtained by kneading a pigment and a solution of the polyester resin or the aqueous acrylic resin.

The coating composition of the present invention may be applied by using usual means such as roll coat, spray coat, brush coat, etc. Examples of can materials to which the coating composition of the present invention is applicable are metal sheets such as tin-plated steel sheet, tin-free steel, aluminum sheet, etc.

The coating composition of the present invention can be hardened under wide baking conditions ranging from baking at 150° C. to 200° C. for about 10 minutes to a high-temperature short-period baking at 250° C. for about 10 seconds.

The alkyl-etherified amino resin to be incorporated into the coating composition of the present invention is derived from spiroguanamine having a spiro ring in its component, and hence has excellent ability to be diluted with water. And a combination of it with the aqueous polyester resin or aqueous acrylic resin can give a coating composition having flexibility and water resistance as a coating and all other performances necessary as a coating on high-hardness cans.

Further, since the molecular weight of spiroguanamine is not less than twice as large as that of melamine, fumes occurring at a baking time at a high temperature are reduced. Thus, the coating composition of the present invention has properties desirable as a coating material for can materials requiring high-temperature baking.

The present invention will be illustrated hereinbelow with reference to Examples, in which part stands for part by weight and % for % by weight.

PREPARATION EXAMPLE 1

Alkyl-Etherified Amino Resin Solution A-1

A four-neck flask having a thermometer, stirrer, reflux condenser and nitrogen-blowing tube was charged with 27.8 parts of spiroguanamine and 72.2 parts of a 40% solution of formaldehyde-containing methanol (Formit MH, trade name, manufactured by Koei Kagaku K.K.), and the mixture was adjusted to pH 10 with sodium methalate and heated at 60° C. for 3 hours. Then, 0.1 part of phthalic anhydride was added, and the mixture was further reacted at 70° C. for 8 hours. Thereafter, methanol and water were removed under reduced pressure, and the rest was filtered with filter paper. The resultant filtrate was adjusted with butyl cellosolve to give a solution having a solid content of 75%.

PREPARATION EXAMPLE 2

Alkyl-etherified amino resin solution A-2

The same flask as that of Example 1 was charged with 22.9 parts of spiroguanamine and 77.1 parts of a 40% solution of formaldehyde-containing methanol (same as that used in Example 1), 0.16 part of 25% sodium hydroxide was added, and then the mixture was heated at 60° C. for 3 hours. Then, 0.15 part of 62% nitric acid (pH 3.5) was charged and the mixture was further reacted at 70° C. for 8 hours. After the reaction, the reaction product was neutralized with 25% sodium hydroxide, and then methanol and water were removed at a temperature of less than 70° C. under reduced pressure. And the rest was filtered with filter paper, and the resultant filtrate was adjusted with butyl cellosolve to give a solution having a solid content of 75%.

PREPARATION EXAMPLE 3

Alkyl-Etherified Amino Resin Solution A-3

The same flask as that of Example 1 was charged with 18.9 parts of spiroguanamine, 79.7 parts of a 40% solution of formaldehyde-containing methanol (same as that used in Example 1) and 1.4 parts of melamine, 0.2 part of 25% sodium hydroxide was added, and then the mixture was heated at 60° C. for 3 hours. Then, 0.13 part of 62% nitric acid (pH 3.5) was charged and the mixture was further reacted at 70° C. for 8 hours. After the reaction, the reaction product was neutralized with 25% sodium hydroxide, and then methanol and water were removed at a temperature of less than 70° C. under reduced pressure. And the rest was filtered with filter paper, and the resultant filtrate was adjusted with butyl cellosolve to give a solution having a solid content of 75%.

PREPARATION EXAMPLE 4

Alkyl-Etherified Amino Resin Solution A-4

The same flask as that of Example 1 was charged with 14.7 parts of spiroguanamine, 52.5 parts of a 40% solution of formaldehyde-containing methanol (same as that used in Example 1 and 2.8 parts of melamine, 0.16 part of 25% sodium hydroxide was added, and then the mixture was heated at 60° C. for 4 hours. Then, 0.15 part of 62% nitric acid (pH 3.5) was charged and the mixture was further reacted at 70° C. for 8 hours. After the reaction, the reaction product was neutralized with 25% sodium hydroxide, and then methanol and water were removed at a temperature of less than 70° C. under reduced pressure. And the rest was filtered with filter paper, and the remaining product was adjusted with butyl cellosolve to give a solution containing a solid content of 75%.

The average numbers of formaldehydes and alkyl ether groups attached per molecule of spiroguanamine or melamine in the above alkyl-etherified amino resins A-1 to A-4 were analyzed, and Table 1 shows the results.

TABLE 1

|  | A-1 | A-2 | A-3 | A-4 |
|---|---|---|---|---|
| Average number of attached formaldehydes *1 | 5.8 | 6.9 | 6.4 | 6.1 |
| Average number of attached alkyl ether group *2 | 4.4 | 5.3 | 4.7 | 4.4 |

*1: According to phosphoric acid method and NMR analysis
*2: According to NMR analysis

PREPARATION EXAMPLE 5

Aqueous Polyester Resin Solution B-1

A four-neck flask having a thermometer, stirrer, reflux condenser with a separation vessel and nitrogen gas blowing tube was charged with 14.7 parts of ethylene glycol, 24.6 parts of neopentyl glycol, 25.6 parts of adipic acid and 29.1 parts of terephthalic acid, and the mixture was heated to 230° C. with stirring while a nitrogen gas was introduced, and allowed to react until the acid value thereof was not more than 5. Then, the reaction product was cooled to 170° C., and 2.6 parts of adipic acid and 3.4 parts of trimellitic anhydride were added to proceed the reaction further. And when an acid value of 60 was obtained, the reaction was stopped. The reaction product was cooled to not more than 80° C., and 8.6 parts of ethylene glycol monobutyl ether, 8.1 parts of dimethyl ethanolamine and 69.1 parts of water were added to give a clear viscous, aqueous polyester resin solution (B-1) having a solid content of 50%, an organic solvent content of 10%, an acid value of 70 before neutralization, a hydroxyl value of 165 and a phenyl ring content of 15.9%.

PREPARATION EXAMPLE 6

Aqueous Polyester Resin Solution B-2

The same flask as that used in Example 5 was charged with 14.2 parts of ethylene glycol, 23.9 parts of neopentyl glycol and 56.4 parts of isophthalic acid, and the mixture was heated to 230° C. with stirring while a nitrogen gas was introduced, and allowed to react until the acid value thereof was not more than 5. Then, the reaction product was cooled to 70° C., and 5.5 parts of trimellitic anhydride was added to proceed the reaction further. And when an acid value of 60 was obtained, the reaction was stopped. The reaction product was cooled to not more than 80° C., and 8.6 parts of ethylene glycol monobutyl ether, 8.2 parts of dimethyl ethanolamine and 69.4 parts of water were added to give a clear viscous, aqueous polyester resin solution (B-2) having a solid content of 50%, an organic solvent content of 10%, an acid value of 60 before neutralization, a hydroxyl value of 163 and a phenyl ring content of 33%.

PREPARATION EXAMPLE 7

Aqueous Polyester Resin Solution B-3

The same four-neck flask as that used in Example 5 was charged with 15.7 parts of ethylene glycol, 26.3 parts of neopentyl glycol, 48.5 parts isophthalic acid and 9 5 parts of maleic anhydride, and the mixture was heated to 200° C. with stirring while a nitrogen gas was introduced and allowed to react until the acid value thereof was not more than 5. Then, the reaction product was cooled to 100° C., 87 parts of n-butanol was charged, and a mixture of 6 parts of acrylic acid, 9 parts of 2-hydroxyethyl acrylate, 15 parts of styrene and 2.4 parts of benzoyl peroxide was added dropwise over 3 hours. Thereafter, the resultant mixture was allowed to react for 1 hour while maintaining its temperature at 105° C., and 0.2 part of benzoyl peroxide was added to proceed the reaction for 1 hour. Then, the reaction was stopped. The reaction product was cooled to 60° C., 7.4 parts of dimethyl ethanolamine and 200 parts of water were added, and n-butanol was distilled off together with water under reduced pressure at 80° C. to give a clear viscous, aqueous polyester resin solution (B-3) having a solid content of 50%, an organic solvent content of 10%, an acid value of 40.5 before neutralization, a hydroxy value of 152 and a phenyl ring content of 32.6%.

PREPARATION EXAMPLE 8

Aqueous Acrylic Resin Solution B-4

A four-neck flask having a thermometer, stirrer, reflux condenser with a separation vessel, dropping vessel and a nitrogen gas blowing tube was charged with 100 parts of n-butanol, and a mixture of 10 parts of acrylic acid, 20 parts of 2-hydroxyethyl methacrylate, 15 parts of styrene, 55 parts of butyl acrylate and 3 parts of benzoyl peroxide was added from the dropping vessel over 3 hours at 105° C. with stirring while a nitrogen gas was introduced. Thereafter, the temperature was maintained at 105° C. to proceed with the reaction for 1 hour. And 0.3 part of benzoyl peroxide was added to proceed the reaction for 1 hour, and the reaction was stopped. The reaction product was cooled to not more than 60° C., 12.3 parts of dimethyl ethanolamine and 200 parts of water were added, and n-butanol was distilled off with water under reduced pressure at 80° C. to give a clear viscous, aqueous acrylic resin solution (B-4) having a solid content of 60%, a residual n-butanol content of 10%, an acid value of 78 before neutralization, a hydroxyl value of 96 and a weight average molecular weight of 15,000.

PREPARATION EXAMPLE 9

Aqueous Acrylic Resin Solution B-5

According to the procedure of Example 8, a four-neck flask was charged with 100 parts of n-butanol, and while maintaining the temperature thereof at 105° C., a mixture of 5 parts of acrylic acid, 10 parts of 2-hydroxyethyl acrylate, 30 parts of styrene, 50 parts of butyl acrylate and 3 parts of benzoyl peroxide was added dropwise from a dropping vessel over 3 hours. Thereafter, the mixture was allowed to react for 1 hour at 105° C., 0.3 part of benzoyl peroxide was added to proceed the reaction, and the reaction was stopped. The reaction product was cooled to not more than 60° C., 12.3 parts of dimethyl ethanolamine and 200 parts of water were added, and n-butanol was distilled off together with water under reduced pressure at 80° C. to give a clear viscous, aqueous acrylic resin solution (B-5) having a solid content of 60 %, a residual n-butanol content of 10%, an acid value of 78 before neutralization, a hydroxyl value of 48 and a weight average molecular weight of 15,000.

PREPARATION EXAMPLE 10

Aqueous Acrylic Resin Solution B-6

According to the procedure of Example 8, a four-neck flask was charged with 100 parts of n-butanol, and while maintaining the temperature thereof at 105° C. and introducing a nitrogen gas, a mixture of 8 parts of acrylic acid, 10 parts of 2-hydroxyethyl acrylate, 30 parts of methyl acrylate, 52 parts of ethyl acrylate and 3 parts of benzoyl peroxide was added dropwise from a dropping vessel over 3 hours with stirring. Thereafter, the mixture was allowed to react for 1 hour at 105° C., 0.3 part of benzoyl peroxide was added to proceed the reaction, and the reaction was stopped. The reaction product was cooled to not more than 60° C., 9.9 parts of dimethyl ethanolamine and 200 parts of water were added, and n-butanol was distilled off together with water under reduced pressure at 80° C. to give a clear viscous, aqueous acrylic resin solution (B-6) having a solid content of 60%, a residual n-butanol content of 10%, an acid value of 63 before neutralization, a hydroxyl value of 43 and a weight average molecular weight of 15,000.

EXAMPLE 1

21.3 parts of the alkyl-etherified amino resin solution A-1, 48 parts of the aqueous polyester resin solution B-1, 0.1 part of p-toluene sulfonate blocked with amine, 30.7 parts of water and 0.1 part of silicone-based leveling agent were mixed to form a coating composition.

EXAMPLES 2–14

Example 1 was repeated to form a coating composition by combining one of the alkyl-etherified amino resin solutions A-1 to A-4 with one of the aqueous polyester resin solutions B-1 to B-3 or one of the aqueous acrylic resin solutions B-4 to B-6 as shown in Table 2.

COMPARATIVE EXAMPLES 1–4

Example 1 was repeated to form a coating composition by combining hexamethoxymelamine (Cymel 303, trade name, manufactured by Mitsui-Cyanamid, Ltd.) with an aqueous polyester resin solution or an aqueous acrylic resin solution as shown in Table 2.

The coating compositions obtained in Examples 1 to 14 and Comparative Examples 1 to 4 were tested on stability of a coating composition and physical properties of a coating according to the following methods, and Table 2 shows the results.

The test methods are as follows

Test on stability of coating composition:

The coating compositions were stored at room temperature for 2 months, and gelled, precipitated or separated states of resins were observed.

Tests on physical properties of coating:

The coating compositions were roll-coated on electroplated tin plates, and the coatings were baked in an oven at 180° C. for 10 minutes to prepare coated panels.

Resistance to Solvent

A rubbing test was carried out by using methyl ethyl ketone, and the number of reciprocation times before a coating was peeled was counted.

Resistance to Water

After heat treatment of a coated panel was carried out by immersing it in water at 100° C. for 30 minutes or at 125° C. for 30 minutes, a whitened state of a coating was evaluated.

Pencil Hardness

Hardness of a coating was evaluated according to a pencil hardness test method under JIS K5400.

Adhesion

Adhesion of a coating was evaluated according to a cross cut adhesion test, in which eleven Cross out lines were made on a coated surface at intervals of 2 mm such that the cross cuts reached a substrate, and cellophane adhesive tape was applied onto the coated surface and peeled off to determine a percentage of peeled coating.

Processability

An Erichsen test was carried out.

Impact Resistance

A test on impact resistance of a coating was carried out by using a du Pont impact tester, in which an impactor having a diameter of ½ inch was brought into contact with a coated surface and a weight of 500 g was fallen thereon. The impact resistance was evaluated in terms of height up to which no crack was caused.

TABLE 2

| | Example | | | | | | | Comparative Example | |
|---|---|---|---|---|---|---|---|---|---|
| | 1 | 2 | 3 | 4 | 5 | 6 | 7 | 1 | 2 |
| Alkyl-etherified amino resin A-1 | 40 | 40 | 40 | | | | 30 | | |
| Alkyl-etherified amino resin A-2 | | | | 40 | | | | | |
| Alkyl-etherified amino resin A-3 | | | | | 40 | | | | |
| Alkyl-etherified amino resin A-4 | | | | | | 40 | | | |
| Cymel 303 | | | | | | | | 40 | 40 |
| Aqueous polyester resin B-1 | 60 | | | 60 | 60 | 60 | 70 | 60 | |
| Aqueous polyester resin B-2 | | 60 | | | | | | | 60 |
| Aqueous polyester resin B-3 | | | 60 | | | | | | |
| Organic solvent content in coating composition | 8% | 8% | 10% | 8% | 8% | 8% | 7% | 8% | 11% |
| Coating stability*3 | ☺ | ☺ | ☺ | ☺ | ☺ | ☺ | ☺ | ☺ | ☺ |
| Tests on Physical properties of coating | | | | | | | | | |
| Resistance to solvent*4 | >100 | >100 | >100 | >100 | >100 | >100 | >100 | >100 | >100 |

TABLE 2-continued

| | Example | | | | | | | Comparative Example | |
|---|---|---|---|---|---|---|---|---|---|
| | | | | | | | | 1 | 2 |
| Resistance to water | | | | | | | | | |
| 100° C.-30 min. | OK | OK | OK | OK | OK | OK | OK | Slightly white | OK |
| 125° C.-30 min. | OK | OK | OK | OK | OK | OK | OK | white | white |
| Pencil hardness | 5H | 5H | 5H | 5H | 5H | 5H | 4H-5H | 4H | 4H |
| Adhesion | 0% | 0% | 0% | 0% | 0% | 0% | 0% | 0% | 0% |
| Processability | >8 mm | >8 mm | >8 mm | >8 mm | >8 mm | >8 mm | >8 mm | 6 mm | 6 mm |
| Impact resistance | 50 cm | 50 cm | 50 cm | 50 cm | 50 cm | 50 cm | 50 cm | 40 cm | 35 cm |

| | Example | | | | | | | Comparative Example | |
|---|---|---|---|---|---|---|---|---|---|
| | 8 | 9 | 10 | 11 | 12 | 13 | 14 | 3 | 4 |
| Alkyl-etherified amino resin A-1 | 40 | 40 | 40 | | | | 30 | | |
| Alkyl-etherified amino resin A-2 | | | | 40 | | | | | |
| Alkyl-etherified amino resin A-3 | | | | | 40 | | | | |
| Alkyl-etherified amino resin A-4 | | | | | | 40 | | | |
| Cymel 303 | | | | | | | | 40 | 40 |
| Aqueous acrylic resin B-4 | 60 | | | | | | | 60 | |
| Aqueous acrylic resin B-5 | | 60 | | 60 | 60 | 60 | 70 | | 60 |
| Aqueous acrylic resin B-6 | | | 60 | | | | | | |
| Organic solvent content in coating composition | 8% | 8% | 10% | 8% | 8% | 8% | 8% | 8% | 11% |
| Coating stability*3 | ⊙ | ⊙ | ⊙ | ⊙ | ⊙ | ⊙ | ⊙ | ⊙ | ⊙ |
| Tests on physical properties of coating | | | | | | | | | |
| Resistance to solvent*4 | >100 | >100 | >100 | >100 | >100 | >100 | >100 | >100 | >100 |
| Resistance to water | | | | | | | | | |
| 100° C.-30 min. | OK | OK | OK | OK | OK | OK | OK | OK | OK |
| 125° C.-30 min. | OK | OK | OK | OK | OK | OK | OK | white | white |
| Pencil hardness | 5H | 5H | 5H | 5H | 5H | 5H | 5H | 4H | 4H |
| Adhesion | 0% | 0% | 0% | 0% | 0% | 0% | 0% | 0% | 0% |
| Processability | >8 mm | >8 mm | >8 mm | >8 mm | >8 mm | >8 mm | >8 mm | 6 mm | 6 mm |
| Impact resistance | 50 cm | 50 cm | 50 cm | 50 cm | 50 cm | 50 cm | 50 cm | 35 cm | 35 cm |

*3 "O" stands for "excellent".
*4 ">100" stands for more than 100 times.

I claim:

1. An aqueous coating composition for coating cans which is soluble in water or a solvent mixture of water as a main component with a hydrophilic organic solvent, which comprises, as a resin component,
   (A) 5 to 60% by weight of an alkyl-etherified amino resin formed by attaching, on average, not less than three, per molecule of spiroguanamine or melamine, formaldehydes to spiroguanamine or a mixture of spiroguanamine with melamine under an addition or condensation reaction, and then alkyl-etherifying the resultant addition or condensation reaction product with methanol, ethanol or a mixture of these, and
   (B) 40 to 95% by weight of an aqueous polyester or acrylic resin having an acid value of to 100 and an hydroxyl value of 10 to 300 and being soluble in water or a solvent mixture of water as a main component with a hydrophilic organic solvent in the presence of a volatile base.

2. A composition according to claim 1 wherein the mixture of spiroguanamine with melamine contains not less than 20% by weight of spiroguanamine based the weight of the mixture.

3. A composition according to claim 1 wherein the aqueous polyester resin contains 5 to 45% by weight of phenyl rings in itself.

4. A composition according to claim 1 wherein the aqueous acrylic resin is a copolymer of α,β-monoethylenically unsaturated carboxylic acid, a hydroxyl group-containing vinyl monomer and other vinyl monomer.

5. A composition according to claim 4 wherein the other vinyl monomer is a monomer which gives a homopolymer having a theoretical glass transition point of not less than 90° C.

6. A composition according to claim 1 wherein the resin component comprises 10 to 40% by weight of the alkyl-etherified amino resin.

7. A composition according to claim 1 which further contains 0.1 to 1 part by weight based on 100 parts by weight of the resin component, of a hardening auxiliary.

* * * * *